(12) United States Patent
Fischier et al.

(10) Patent No.: US 7,213,390 B2
(45) Date of Patent: May 8, 2007

(54) CYLINDER LAWN MOWER AND CYLINDER UNIT INTENDED THEREFOR

(75) Inventors: Mats Fischier, Båstad (SE); Sture Larsson, Veberöd (SE)

(73) Assignee: Mats Fischier I Båstad AB, Båstad (SE)

( * ) Notice: Subject to any disclaimer, the term of this patent is extended or adjusted under 35 U.S.C. 154(b) by 165 days.

(21) Appl. No.: 10/507,898

(22) PCT Filed: Mar. 19, 2003

(86) PCT No.: PCT/SE03/00457

§ 371 (c)(1),
(2), (4) Date: Sep. 17, 2004

(87) PCT Pub. No.: WO03/077637

PCT Pub. Date: Sep. 25, 2003

(65) Prior Publication Data

US 2005/0138912 A1 Jun. 30, 2005

(30) Foreign Application Priority Data

Mar. 20, 2002 (SE) .................................. 0200835

(51) Int. Cl.
*A01D 34/52* (2006.01)
*A01D 34/53* (2006.01)
(52) U.S. Cl. .......................................... 56/294; 56/156
(58) Field of Classification Search ................. 56/156, 56/249, 294, 12.4, 12.5
See application file for complete search history.

(56) References Cited

U.S. PATENT DOCUMENTS

| 1,109,776 | A |   | 9/1914  | McGriff                |
|-----------|---|---|---------|------------------------|
| 1,935,013 | A | * | 11/1933 | Burcke ............ 56/249 |
| 2,042,854 | A | * | 6/1936  | Macconochie ...... 56/294 |
| 2,056,369 | A |   | 10/1936 | Roessel                |
| 2,535,185 | A |   | 12/1950 | Adamczyk               |
| 2,730,857 | A |   | 1/1956  | Myers                  |
| 3,054,247 | A |   | 9/1962  | Roesler                |
| 3,144,745 | A |   | 8/1964  | Sharps                 |
| 3,358,429 | A | * | 12/1967 | Claas ................. 56/153 |
| 6,668,534 | B2| * | 12/2003 | Sheedy et al. ....... 56/364 |
| 6,986,241 | B2| * | 1/2006  | Beck .................. 56/364 |

FOREIGN PATENT DOCUMENTS

EP        0349944 A2    1/1990

* cited by examiner

*Primary Examiner*—Árpád Fábián Kovács
(74) *Attorney, Agent, or Firm*—Birch, Stewart, Kolasch & Birch, LLP

(57) ABSTRACT

A cylinder unit for a cylinder lawn mower has a cylinder rotatable about a longitudinal axis and provided with at least one knife, and an insertion device for engaging and inserting grass into a fixed abutment. Each knife by rotation of the cylinder is movable to a cutting position, in which the knife cooperates with the abutment to allow grass cutting. The insertion device has a plurality of pins with a radially outer end. Each pin is movably arranged between a first position wherein the pin extends beyond the periphery of the cylinder so that the outer end of the pin is located radially outwardly of each knife and a second position wherein the pin is located inwardly of the periphery of the cylinder so that the outer end of the pin is located radially inwardly of or radially on a level with each knife.

26 Claims, 12 Drawing Sheets

CYLINDER LAWN MOWER AND CYLINDER UNIT INTENDED THEREFOR

FIELD OF THE INVENTION

The present invention generally relates to a cylinder lawn mower and a cylinder unit intended therefor, and more specifically a cylinder unit, comprising a fixedly mounted abutment, a cylinder means, which is rotatable about a longitudinal axis and which is provided with at least one knife, and an insertion means for engaging and inserting grass into the abutment, each knife by rotation of the cylinder means being movable to a cutting position, in which the knife cooperates with the abutment to allow grass cutting.

BACKGROUND ART

Conventional cylinder lawn mowers usually comprise a cylinder unit with a plurality of peripherally mounted helical knives, which cooperate with an abutment arranged at the underside of the cylinder unit.

When cutting grass by means of such a cylinder lawn mower, the vegetation on a lawn, hereinafter referred to as grass, is inserted between the respective knives and the abutment. The cooperation of the knives and the abutment yields an almost scissor-like cutting of the grass, which is preferable since it results in a distinct cutting surface which thus is kind to the grass.

Nevertheless, cylinder lawn mowers of the above-mentioned type suffer from certain drawbacks.

When the grass is long, the blades of grass may intersect and press each other down. The grass may also be flattened for some other reason, for example, due to precipitation or if someone has trampled it down. Owing to this, the grass may not be properly inserted between the abutment and the respective knives. It goes without saying that this will result in the grass not being cut at all or not being cut in a satisfactory manner. Another reason for the grass not being cut satisfactorily, in particular in the case of motor-driven lawn mowers, is that the air stream generated by the cylinder presses the grass down so that it will not contact the abutment and the knife.

Occasionally, individual blades of grass or plants (such as dandelions), hereinafter generally referred to as blades of grass, may shoot up from the lawn. These long blades of grass are usually difficult to cut using a cylinder lawn mower since they are almost always pushed forward and then bent under the abutment, thereby not being cut. As a result, extra work is needed to obtain a satisfactory cutting result.

Another problem relates to mulching, i.e. cutting of the clippings into finer pieces so that they can be returned to the lawn in an aesthetically attractive manner.

A conventional cylinder lawn mower cuts grass at a preset cutting level. The cut grass is then usually spread on the new-cut lawn and remains clearly visible, often in an unattractive way. This is why the grass is often collected and removed from the lawn. The cut grass can, for example, be collected by being put directly in a container or by being raked up after the cutting of the lawn. However, this is unfavourable since nutrients are removed from the lawn.

In rotor lawn mowers, this problem is partly solved by means of a system for cutting the grass into finer pieces. Thanks to this, the grass can be returned to the lawn in an aesthetically attractive manner since the finely cut grass can filter back into the lawn, thereby being less conspicuous. Furthermore, the clippings decompose more quickly if cut into finer pieces. One type of such a rotor lawn mower retains the clippings in the rotor housing for further cutting into finer pieces, whereupon they fall down on the lawn.

Mulching is thus common today in rotor lawn mowers, but it has been found that it is difficult to provide mulching in cylinder lawn mowers, especially as cylinder lawn mowers are known to cut each blade of grass once at the lowest level without any further processing of the clippings.

One type of cylinder lawn mower is known from U.S. Pat. No. 2,157,620. This cylinder lawn mower comprises a rake-like means which is arranged in front of the cylinder unit to force the grass into an upright position before it is cut. This cylinder lawn mower solves the problem of flattened grass. It does not, however, solve the problems involved in the cutting of long grass or individual long blades of grass. This prior-art cylinder lawn mower, if anything, makes these problems even worse since instead of raising the blades of grass to facilitate the cutting thereof it bends them in the travelling direction of the cylinder lawn mower. As a result, the blades of grass end up under the abutment and are thus not cut. In addition, the prior-art cylinder lawn mower does not offer any solution to the problem of mulching, i.e. the cutting of the clippings into finer pieces.

Different types of cylinder lawn mowers have been suggested to solve at least one of the above-mentioned problems. In particular, cylinder lawn mowers of the type stated by way of introduction are known, which comprise insertion means for engaging and inserting grass into the abutment.

Such a cylinder lawn mower, comprising teeth arranged on the knives, is disclosed in U.S. Pat. No. 1,109,776. In U.S. Pat. No. 1,970,489, a cylinder lawn mower is described which comprises bars which are provided with teeth and which are arranged between the knives. These prior-art cylinder lawn mower do not, however, solve the above-mentioned problems since the teeth on the bar-like structures contribute to the compression of the grass, which yields an unsatisfactory cutting result.

Another variant of a cylinder lawn mower is disclosed in U.S. Pat. No. 2,056,369. Also in this document, the cylinder unit comprises bars provided with teeth. However, the bar provided with teeth is guided by a groove in an oval path to engage grass outside the radius of gyration of the knives. This does not either solve the above-mentioned problems since the bars provided with teeth press down the grass.

U.S. Pat. No. 2,730,857 discloses another variant of a cylinder lawn mower, which comprises pins which are supported by the same structure as the knives. The pins extend outwards to the same radial level as the knives or somewhat inwardly thereof. Also this variant fails to solve the above-mentioned problems, since the pins do not come into sufficient contact with the grass, thereby not providing any additional insertion of grass between the knife and the abutment.

U.S. Pat. No. 3,144,745 describes a cylinder lawn mower in which teeth are arranged on the knives. The teeth extend beyond the knives in the radial direction, thereby providing improved engagement with the grass. The abutment has recesses matching the shape of the teeth, so that the teeth will not hit the abutment as they pass. However, this solution is not satisfactory as the teeth will engage the grass and feed it to a position under the abutment where the knives cannot cooperate with the abutment for cutting.

SUMMARY OF THE INVENTION

The object of the present invention is, while taking that mentioned above into consideration, to provide an improved cylinder unit of the type mentioned by way of introduction and an improved cylinder lawn mower comprising such a cylinder unit.

The cylinder unit should preferably allow satisfactory cutting of long grass.

The cylinder unit should preferably also allow cutting of individual long blades of grass or other plants growing on a lawn, such as dandelions.

Finally, the cylinder unit should preferably also allow satisfactory cutting of the clippings into finer pieces so that they can be returned to the lawn in an aesthetically attractive manner.

More specifically, according to the present invention a cylinder unit for a cylinder lawn mower is provided, comprising a fixedly mounted abutment, a cylinder means, which is rotatable about a longitudinal axis and which is provided with at least one knife, and an insertion means for engaging and inserting grass into the abutment, each knife by rotation of the cylinder means being movable to a cutting position, in which the knife cooperates with the abutment to allow grass cutting. The cylinder unit is characterised in that the insertion means comprises a plurality of pins with a radially outer end, each pin being movably arranged between a first and a second position, in which first position the pin extends beyond the periphery of the cylinder means so that the outer end of the pin is located radially outwardly of each knife and in which second position the pin is located inwardly of the periphery of the cylinder means so that the outer end of the pin is located radially inwardly of or radially on a level with each knife, the pin being arranged to take the first position in an angular range, seen in the direction of rotation of the cylinder means, immediately before the cutting position and the second position at least when passing the cutting position.

As a result, an improved cylinder unit for a cylinder lawn mower is obtained. More specifically, the cylinder unit according to the invention has a rotatable cylinder means with an insertion means provided with movably arranged pins which are adapted to engage, for example raise, comb and orient, the grass and insert it into an abutment. The fact that the pins operate outwardly of the periphery of the cylinder means presents the advantage that a greater engagement depth and thus an improved capability of the insertion means to raise, comb and orient the grass are obtained as well as a larger operating area for engagement and insertion. Consequently, this ensures that the grass, even if it is long, is inserted into the abutment and applied between the abutment and the respective knives to allow a satisfactory cutting result. The insertion means will also engage individual long blades of grass, which ensures that they will also be satisfactorily cut. Finally, the engagement of the insertion means with the grass causes the grass to be oriented towards the abutment and conveyed to the same with its tops turned towards the abutment. Owing to this, each individual blade of grass can be cut repeatedly, i.e. into finer pieces. Thus, the inventive cylinder unit allows mulching, i.e. cutting of the clippings into finer pieces. It should in particular be noted that said mulching is provided without any noticeable increase of the energy consumption which in the case of cylinder lawn mowers is very low.

In the present application, the expression "pin" refers to any suitable, individual, elongate means which will "comb" the grass when in contact with the same. Unlike bars provided with teeth, in which the teeth co-operate and in which also the bar comes into contact with the grass, pins operate individually and independently of each other. The expression "individually" means that there is no connection between the pins which also operate radially outwardly of the knives.

In one embodiment, each pin can, in operation, have an upward motion component when passing the cutting position. The upward motion of the pins causes them to raise the grass, thereby inserting it between the knife and the abutment. The motion also gives the advantage that grass which has been bent or flattened is cut with a satisfactory result.

The outer end of the pins can have an upward motion component in a subrange of the angular range immediately before, seen in the direction of rotation of the cylinder means, said cutting range. The upward motion immediately before the cutting position causes the grass to be raised between the knife and the abutment.

It also results in the outer end of the pin being arranged under the abutment before it takes its position in the cutting position. Owing to the fact that the outer end is arranged under the abutment, the pins will reach flattened grass and raise it between the knife and the abutment.

The cylinder unit can also comprise a pin shaft which is arranged eccentrically to the longitudinal axis of the cylinder means and which supports the pins. This design ensures that the above-mentioned advantages can be obtained by means of a reliable and relatively simple construction. The rotation of the pins about an axis presents the advantage that the forces acting on the pins will be relatively weak.

The pins can extend from said pin shaft in the radial direction.

The pins can be rotatably mounted on said pin shaft.

The cylinder means can when rotated be adapted to engage the pins to rotate them about said pin shaft.

In another embodiment, the insertion means further comprises a plurality of discs, which are concentrically arranged about and equidistantly arranged along said longitudinal axis. The discs can be adapted to support the at least one knife. By selecting an appropriate number of discs, the radial cross-sectional surface of each knife can be reduced in relation to the cross-sectional surface of the knives on a conventional cylinder unit, since the distance between the points of support of the knives, i.e. the discs, will be comparatively shorter.

It should be noted that the above-mentioned discs give advantages even if they are not combined with the present invention. It is thus feasible to provide a cylinder unit with discs only.

According to one embodiment, the discs of the insertion means have peripherally arranged teeth and a number of teeth on each disc are advantageously set, thereby allowing the insertion means to operate, in spite of a reduced number of discs, along substantially the entire length of the cylinder means along the longitudinal axis. More specifically, the set teeth reinforce the engagement of the insertion means with the grass, since the setting of the teeth allows the teeth to catch the grass.

In one embodiment, the set teeth of each disc are set in two opposite directions so as to better cover the entire length of the cylinder means along the longitudinal axis.

The teeth of each disc can be located radially on a level with each knife, which ensures a sufficient penetration depth of the insertion means when it engages the grass.

The insertion means can be arranged for said engagement and insertion of grass along substantially the entire length of the cylinder means along the longitudinal axis.

In one embodiment, the insertion means can be made of a metallic material and/or have a wear-resistant surface layer, thus having a longer service life.

In another embodiment, the teeth of each disc are made of a metallic material and/or have a wear-resistant surface layer. The manufacturing cost is thus reduced since only the teeth need to be made of said material or be provided with said surface layer. Moreover, the teeth will have a longer service life.

In one embodiment, the teeth are replaceable so that they can easily be exchanged if damaged or worn.

In a further embodiment, the pins are made of a metallic material and/or have a wear-resistant surface layer. The manufacturing cost is thus reduced since only the pins need to be made of said material or be provided with said surface layer. The pins will also have a longer service life.

In one embodiment, a cylinder unit comprises a second abutment arranged, seen in the direction of rotation of the cylinder means, after the first abutment, said first abutment being located substantially under the cylinder means. As a result, the cut grass, hereinafter referred to as clippings, is cut and divided into finer pieces once more at the second abutment. In this case, the cylinder unit advantageously comprises a guiding plate, which is arranged to convey cut grass from the first abutment to the second abutment.

According to yet another embodiment, the cylinder means comprises a stopping means which prevents the abutment from being displaced radially inwards. The stopping means advantageously comprises at least one circular plate which is supported by a shaft and has a continuous peripheral edge arranged immediately radially inwardly of the abutment. As the stopping means formed as a circular plate ensures that the abutment cannot be displaced radially inwards, the insertion means cannot engage the abutment when the latter is affected by a stone or the like lying on the ground.

It should be pointed out that the above-mentioned embodiments can be used both separately and in various desirable combinations.

The present invention further relates to a cylinder lawn mower, comprising at least one cylinder unit according to that stated above. As a result, an improved cylinder lawn mower is obtained which cuts the grass in a more satisfactory manner and which also cuts the clippings into finer pieces.

Finally, according to the present invention a cylinder lawn mower is provided which comprises a first cylinder unit as stated above and a second cylinder unit, the second cylinder unit being arranged, seen in the travelling direction of the cylinder lawn mower, after the first cylinder unit. According to one embodiment, a guiding plate is arranged to convey cut grass from the first cylinder unit to the second cylinder unit. The second cylinder unit advantageously comprises a special abutment, said guiding plate being arranged to convey cut grass to said abutment. This ensures that the clippings will be passed on to the second cylinder unit to be cut into finer pieces at the abutment thereof.

According to one embodiment, the inventive cylinder lawn mowers are of a ride-on type, which means that the qualities of the inventive cylinder unit can be used in cylinder lawn mowers intended for cutting large areas, such as parks and golf courses.

The present invention will be described in more detail below with reference to the accompanying drawings, which for the purpose of exemplification show embodiments of the invention. Parts and components with essentially the same functions will be given the same reference numerals.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF PREFERRED EMBODIMENTS

Figure 1:
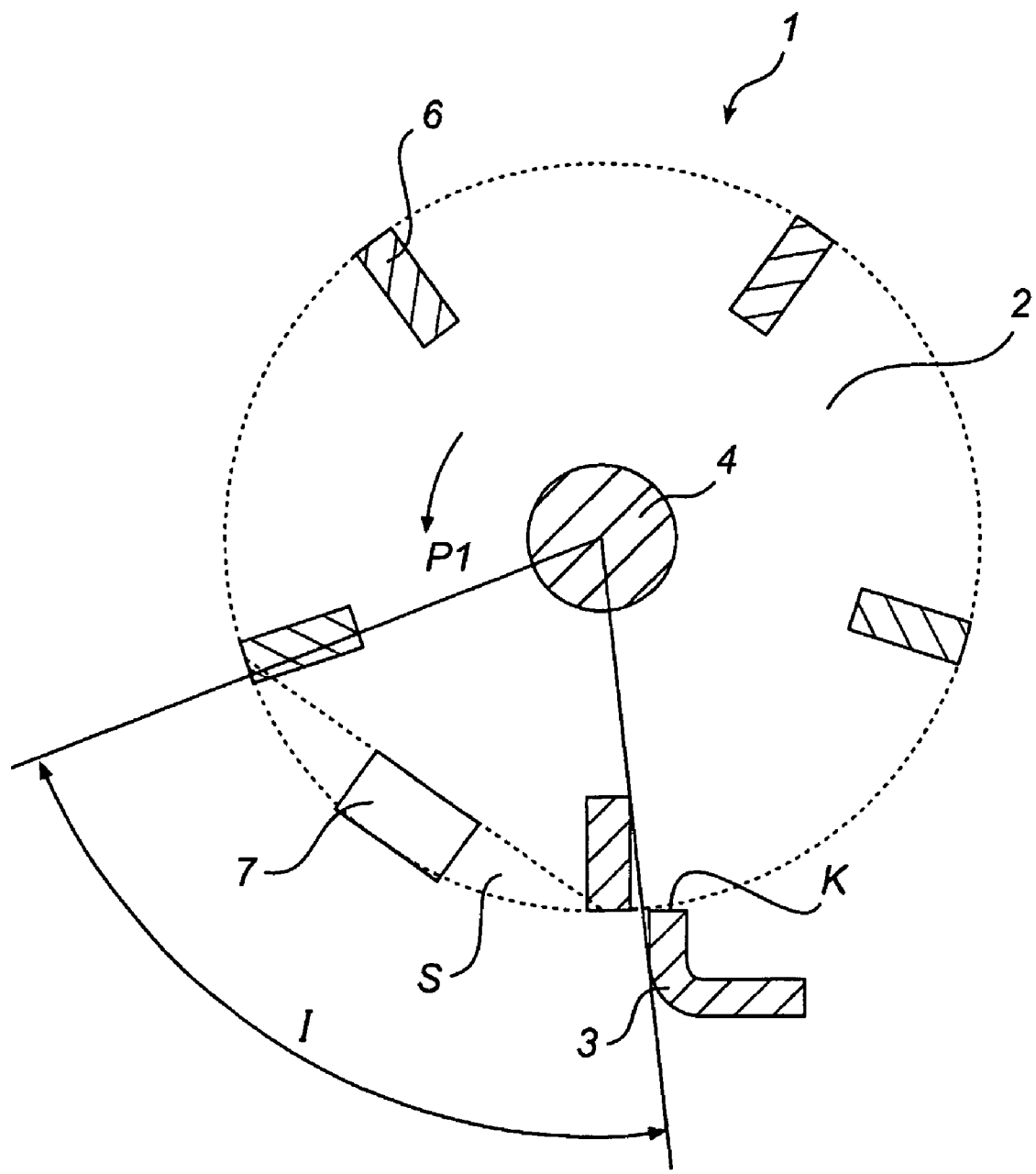
FIG. 1 is a side view which schematically illustrates a cylinder unit.

Reference is made to FIG. 1, which schematically shows a cylinder unit 1 for a cylinder lawn mower.

The cylinder unit 1 comprises a structure (not shown) which supports a cylinder means 2 and an abutment 3.

More specifically, the cylinder means 2 has a shaft 4 which extends along its longitudinal axis and which is rotatably mounted in said structure. The shaft 4 supports a number of knives 6, which extend helically in conventional manner at a radial distance from the shaft 4.

The abutment 3 is fixedly mounted on the structure and is arranged at the underside of the cylinder unit 1 radially outwardly of the cylinder means 2.

By rotating the cylinder means 2 in the direction indicated by the arrow P1 with the aid of a driving means (not shown), which is connected to the shaft 4 of the cylinder means 2 in a suitable manner, each knife 6 is cyclically movable to a cutting position K, in which it cooperates with the abutment 3 to allow grass cutting. Owing to the helical shape of the knives 6, an almost scissor-like cutting action is obtained as the respective knives 6 pass said cutting position K.

The cylinder unit 2 also comprises an insertion means 7.

The insertion means 7 comprises drivers which operate in the free circular segment S formed between each pair of knives and which can also be arranged to operate sometimes radially outwardly of said circular segment S.

More specifically, the insertion means 7 is arranged to engage the grass, by the rotation of the cylinder means 2, in an angular range I located, seen in the direction of rotation P1 of the cylinder means 2, before said cutting position K and to insert the grass into the abutment 3.

The insertion means 7 can be designed in a number of different ways.

Figure 2:
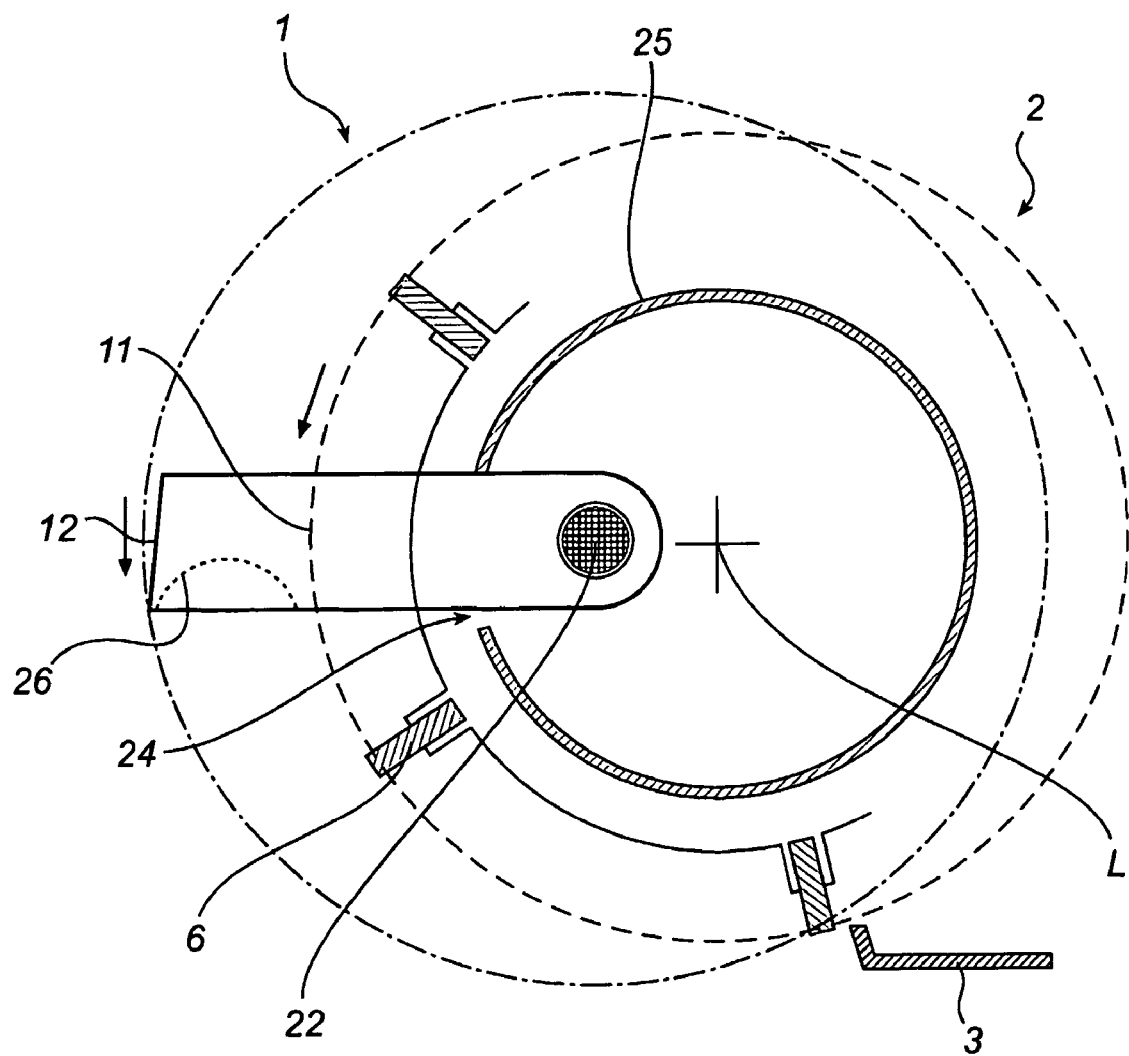
FIG. 2 is a schematic side view of a first embodiment of an inventive cylinder unit.
Figure 3:
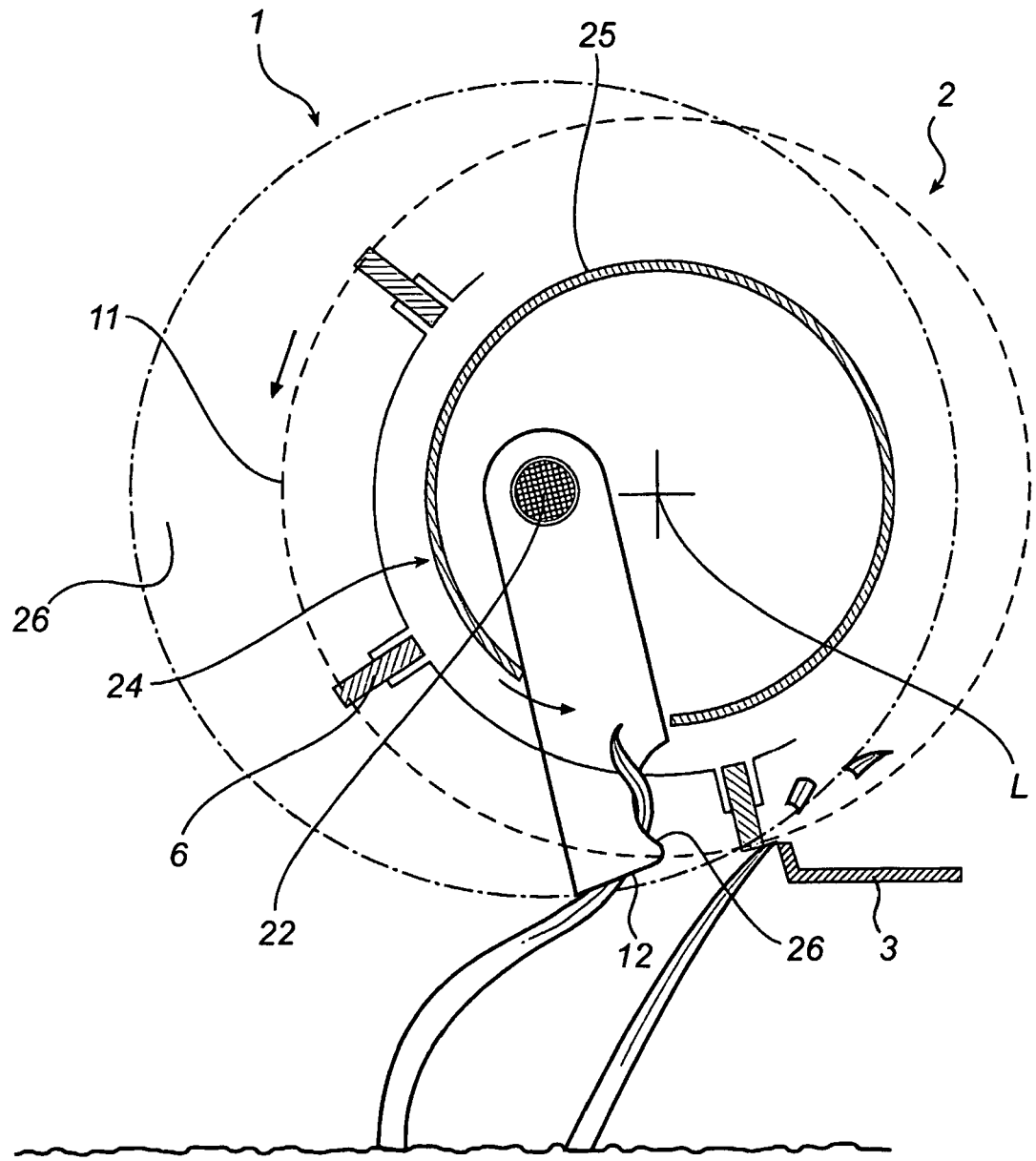
FIG. 3 is a schematic side view which illustrates the cylinder unit shown in FIG. 2 during cutting.

FIGS. 2 and 3, to which reference is now made, show a first embodiment of an inventive cylinder unit 1. In this embodiment, the insertion means comprises pins 11. The pins 11 are supported by a pin shaft 22 such that they extend substantially radially from the same. The pins 11 are further rotatably mounted about said pin shaft 22. The pin shaft 22 is eccentrically oriented in relation to the longitudinal axis L of the cylinder means 2. Moreover, the cylinder means 2 comprises a driver means 25 in the form of a cylinder structure 25, which is arranged concentrically around the longitudinal axis L and which is provided with holes 24. The pins 11 extend outwards from the pin shaft 22 and through said holes 24 in the cylinder structure 25. The holes 24 are larger than the pins 11 as the angle of the pins 11 relative to the hole 24 changes during rotation. The pins 11 are arranged so as to not get into contact with the knives 6 during rotation. When rotating the cylinder means 2, and thus also its cylinder structure 25, the pins will be caused to rotate around said pin shaft 22 owing to the engagement between the respective pins 11 and the cylinder structure 25. As the pins 11 are eccentrically mounted in relation to the longitudinal axis L of the knives 6, the pins 11 rotate such that each pin 11 is movably arranged between a first and a second position. In the first position, the pin 11 extends beyond the periphery of the cylinder means 2 so that the outer end 12 of the pin 11 is located radially outwardly of each knife 6. In the second position, the pin 11 is arranged inwardly of the periphery of the cylinder means 2 so that the outer end 12 of the pin 11 is located radially inwardly of or radially on a level with each knife 6. In this connection, the periphery of the cylinder means refers to the cylinder made up by the knives 6 when rotating.

Owing to the eccentricity, the pins 11, when rotated, are arranged to take the first position in an angular range I, seen in the direction of rotation P2 of the cylinder means 2, immediately before the cutting position K and the second position at least when passing the cutting position K. As a result, an insertion means 7 is provided which efficiently combs the grass 9 and raises it between the knife 6 and the abutment 3, as shown in particular in FIG. 3. Owing to the eccentricity of said pin shaft 22 in relation to the longitudinal axis L of the cylinder means 2, the insertion of the grass can be controlled so that a sufficient degree of insertion is obtained. The pins 11 can have a recess 26 at their outer end, which is shown in FIG. 3. The recess 26 gives the advantage that the engagement between the pin 11 and the grass is further improved. The outer end 12 of the pin 11 can be angled to reduce the risk of twigs and stones being inserted between the knife 6 and the abutment 3. The transition between the recess 26 and the outer end 12 of the pin 11 can be rounded, as shown in FIG. 3, to further reduce the risk of twigs and stones getting stuck between the knife 3 and the abutment. The pin shaft's eccentricity in relation to the longitudinal axis L of the cylinder means 2 causes the pin 11, during rotation, to operate under the abutment 3 in a subrange of the angular range. After the pin 11 has passed its lower position, which is located under and before the abutment 3, it obtains an upward motion component. As a result, the pin 11 will engage grass located under the abutment 3 and raise the grass to insert the same between the knife 6 and the abutment 3.

Figure 4:
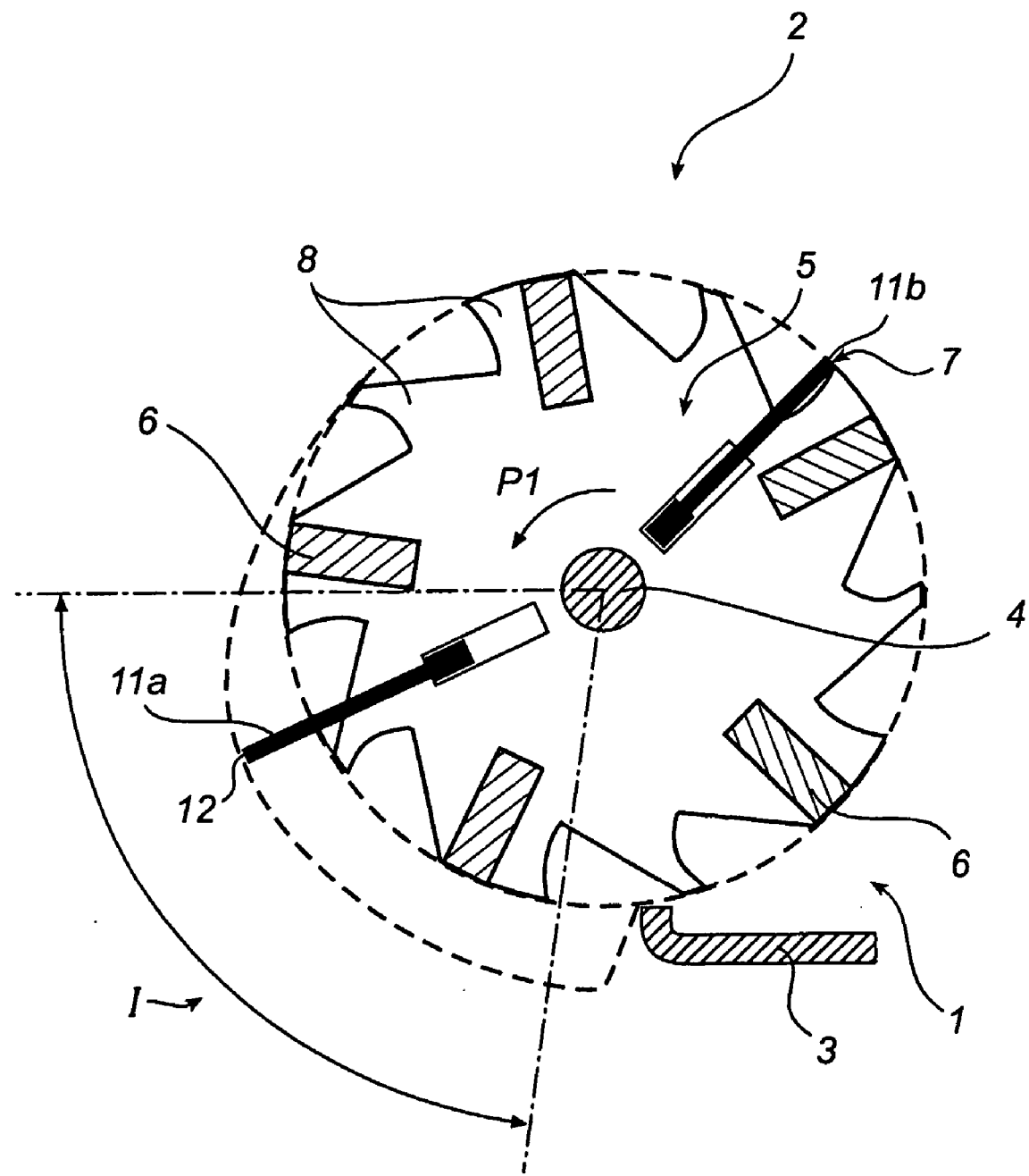
FIG. 4 is a schematic side view of a second embodiment of an inventive cylinder unit.

Reference is now made to FIG. 4, which shows a second embodiment of an inventive cylinder unit 1, which differs from the embodiment shown in FIG. 2 in that it comprises an insertion means 7 in the form of a number of pins 11*a*, 11*b*, which are supported by discs 5 (of which one only is seen in the Figure) that are fixedly mounted on the shaft 4 of the cylinder means 2. According to the second embodiment, each disc 5 supports two pins 11*a*, 11*b*, but it is, of course, also conceivable to provide each disc 5 with one pin or with more than two pins. As is evident, the insertion means 7 also comprises teeth 8 which are peripherally arranged on the discs 5 and which are described in more detail below, but it will be understood that the discs 5 do not have to comprise teeth 8 in combination with the pins 11*a*, 11*b*. It will also be understood that the pins can be supported by some means other than discs 5. The advantage of the discs 5 is that they prevent grass from being displaced in the lateral direction, which will be explained in more detail below, and it is thus convenient to let the pins 11*a*, 11*b* be supported precisely by discs 5.

The pins 11*a*, 11*b* are arranged to engage the grass, when rotating the cylinder means 2, radially outwardly of the knives 6 and to insert it into the abutment 3.

More specifically, the pins 11*a*, 11*b* are movable in the radial direction between a first position and a second position. The pin 11*a* is depicted in said first position, in which the outer end 12 of the pin 11*a* is located radially outwardly of the knives 6. The pin 11*b* is depicted in said second position, in which the outer end 12 of the pin 11*b* is located radially on a level with the knives 6.

The insertion means 7 further comprises a guiding means (not shown), such as a cam mechanism, which is arranged to guide the pins 11*a*, 11*b* so as to move them to said second position when passing the abutment 3 and to said first position at least when passing said angular range I. The guiding means can be arranged to move the outer end 12 of the respective pins 11*a*, 11*b*, during the rotation of the cylinder means 2, to the position indicated by the dashed line. It will be appreciated that the pins can also be actuated by a guiding means in the form of, for example, an electromagnet, a hydraulic means or a spring means.

As the insertion means 7 is adapted for engagement with the grass in said angular range I radially outwardly of the knives 6, the penetration depth of the insertion means 7 is increased, which has a positive effect on the capacity of the insertion means 7 to raise, comb and orient the grass for subsequent insertion thereof into the abutment 3.

It will be understood that the pins do not have to be designed in the above-described manner. It is, for example, conceivable to form said outer ends as claws. It is also conceivable to design the pins as rake-like means. Thus a comparatively smaller number of laterally arranged pins can cover a given cutting width. It is therefore possible to reduce the number of discs along the shaft of the cylinder unit or, alternatively, to exclude the pins on some of said discs. Moreover, it is possible to angle the pins relative to each other to set them, thereby ensuring that the insertion means operates along substantially the entire length of the cylinder means in the longitudinal direction.

The pins 11*a*, 11*b* shown in FIG. 4 further have a substantially radial extension. This is not necessary however. They can, for example, be arranged so as to extend slightly forward in the direction of rotation of the cylinder means.

Figure 5:
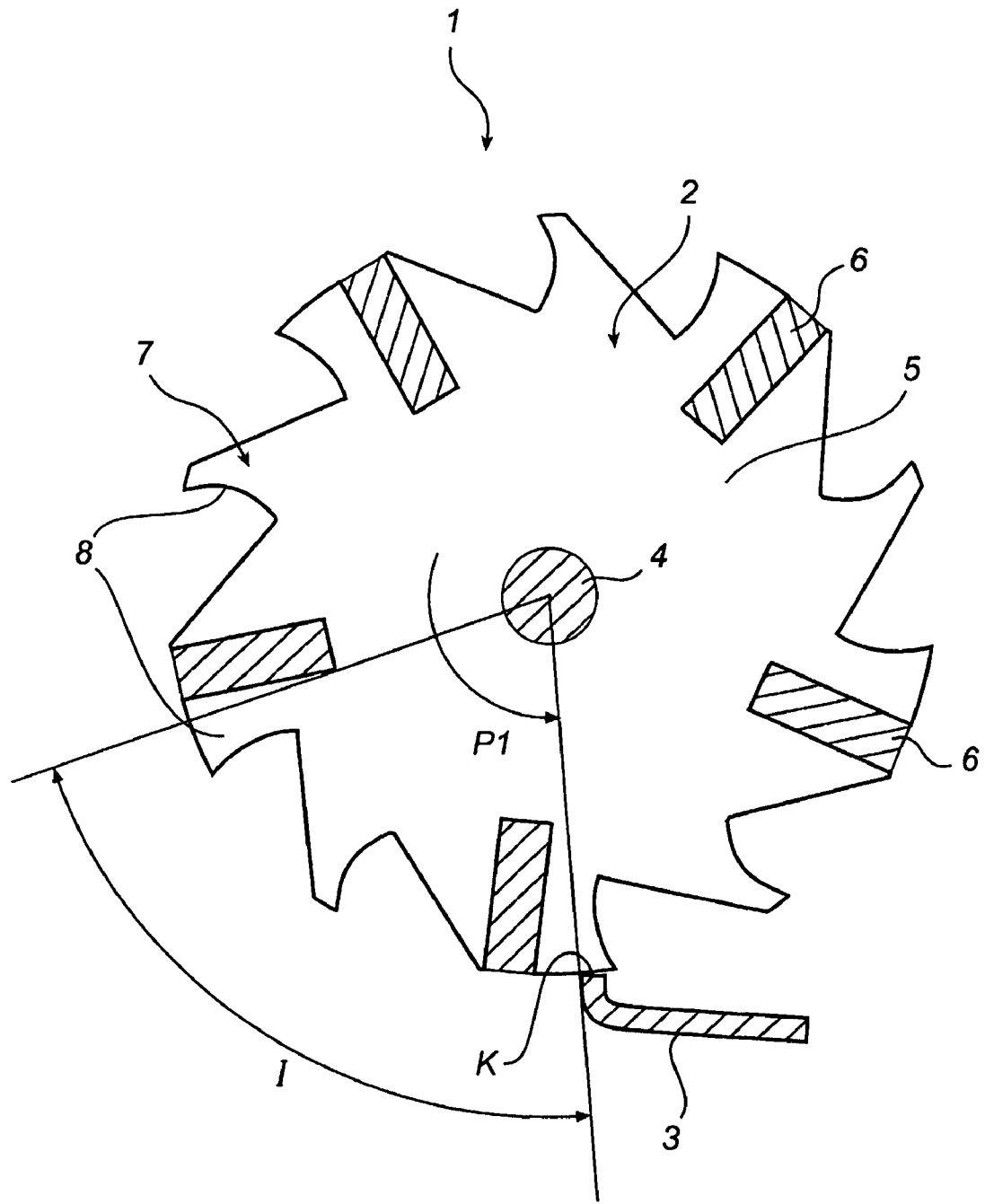
FIG. 5 is a schematic side view of an embodiment of a cylinder unit with discs only.
Figure 6:
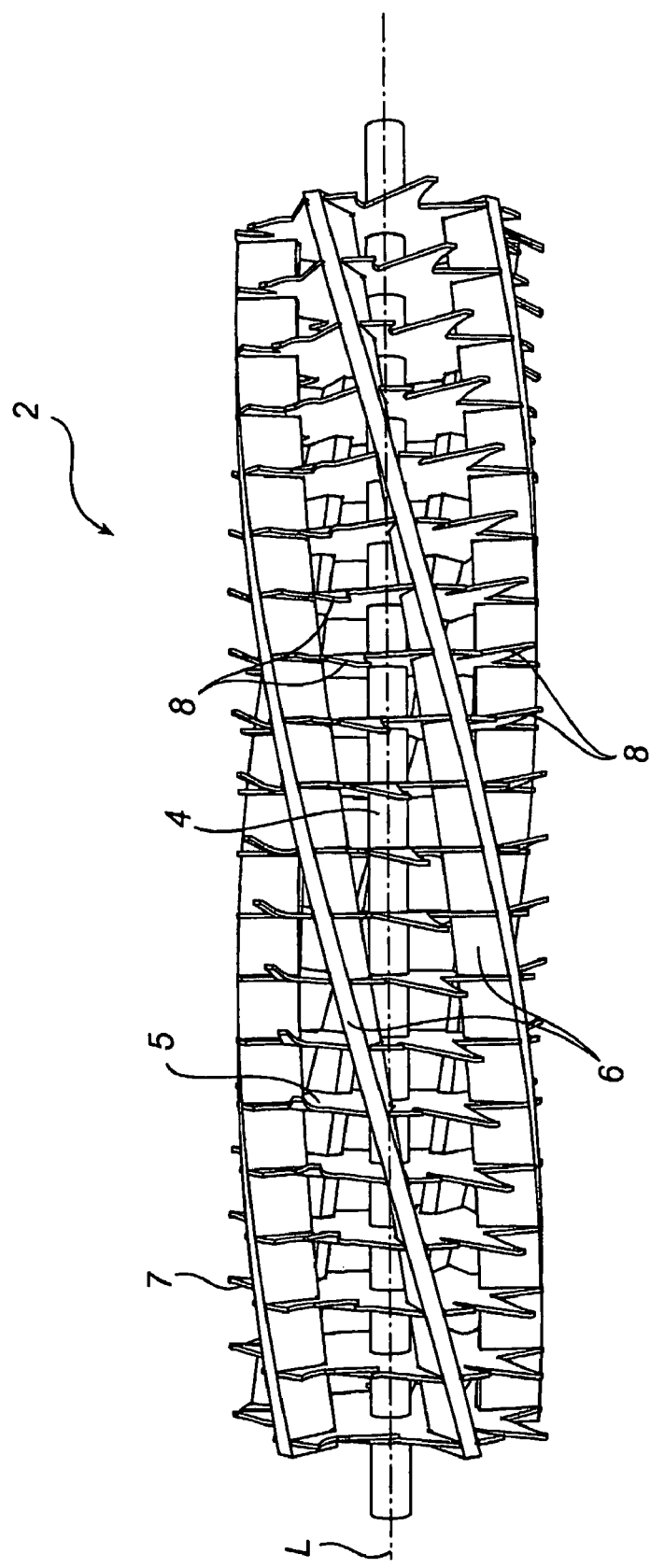
FIG. 6 is a perspective view of the cylinder unit shown in FIG. 5.

Reference is now made to FIGS. 5 and 6, which illustrate a cylinder unit 1, in which the insertion means 7 is formed of a plurality of fixedly mounted discs 5 with peripherally arranged teeth 8, which discs 5 are equidistantly and concentrically arranged about the shaft 4 extended along the longitudinal axis L.

A number of the teeth 8 on each disc 5 are set in mutually opposite directions, which is clearly shown in FIG. 6.

Said teeth 8 can be formed integrally with said discs 5. It is also conceivable for the teeth to be formed separately, which, for example, allows replacement of worn teeth without necessitating a change of the entire disc.

When cutting grass with the cylinder unit 1, the knives 6 of the cylinder means 2 will thus cooperate with the abutment 3 in a conventional manner. At the same time, the insertion means 7 formed by the teeth 8 of the discs 5 will act as drivers by engaging the grass and inserting the same into the abutment 3. As the teeth 8 are set, it is possible to ensure that the insertion means 7 operate along substantially the entire length of the cylinder means 2 in the longitudinal direction.

Figure 7:
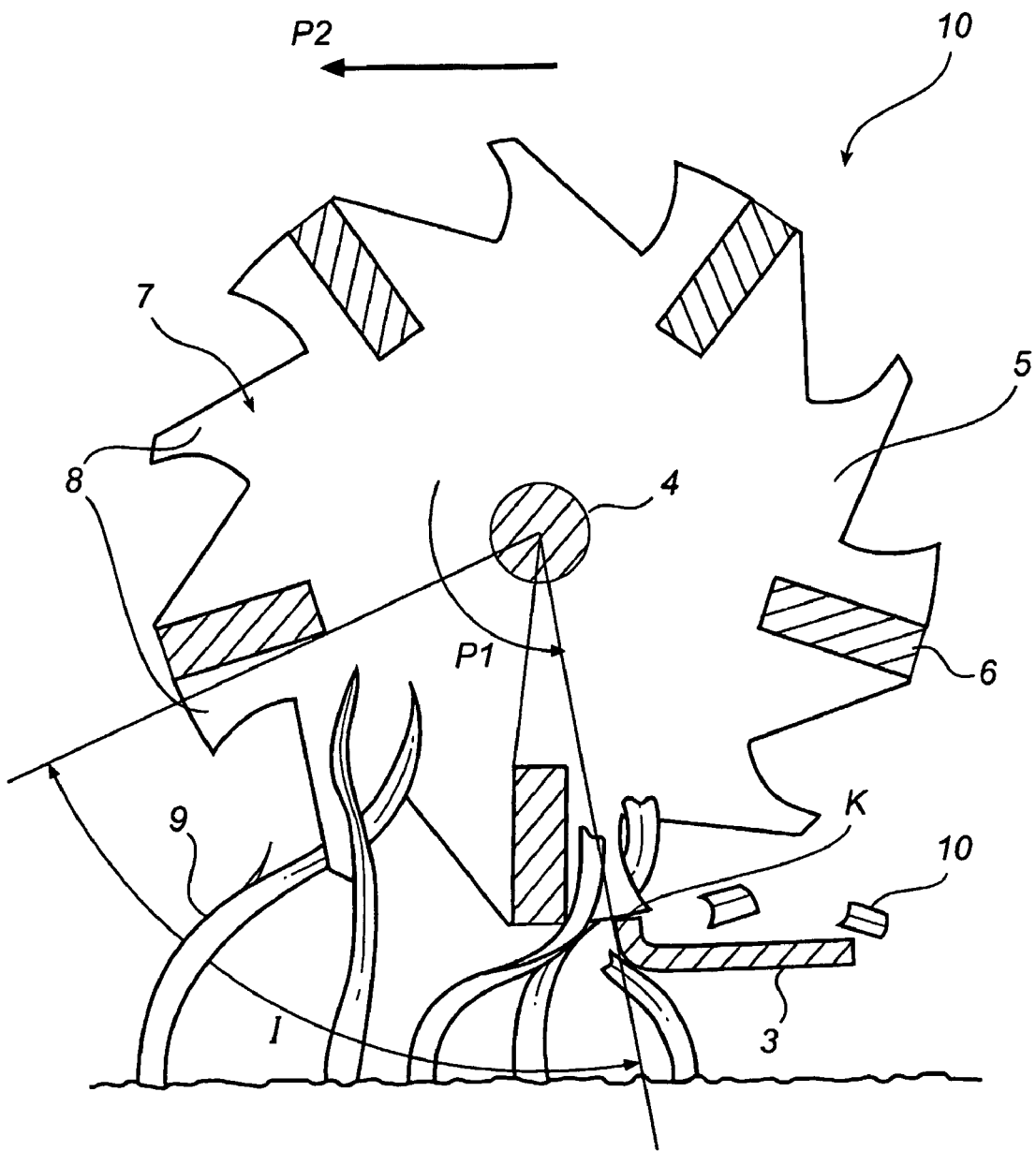
FIG. 7 is a schematic side view which illustrates the cylinder unit shown in FIG. 5 during cutting.

The function of the insertion means 7 during grass cutting is illustrated more clearly in FIG. 7, to which reference is now made. The cylinder unit 1 is caused to advance over a lawn in the direction indicated by the arrow P2, while the cylinder means is rotated in the above-mentioned direction P1. In this Figure, the teeth 8 on the discs 5 of the cylinder means are shown as they engage grass 9 in said angular range I which is located before said cutting position K and as they raise, comb and orient the grass 9. More specifically, the Figure illustrates how the teeth 8, owing to the fact that they are set, engage bunches of grass, thereby acting to raise, comb and orient the grass. The teeth 8 also ensure that the grass 9 is conveyed to the abutment 3 in this raised, combed and oriented state and is inserted between the abutment 3 and the respective knives 6 as the knives pass said cutting position K. This eliminates the risk of the grass 9, even if it is long, being brought to the underside of the abutment 3.

Furthermore, the grass 9 will be brought to the abutment 3 with its tops turned towards the abutment 3. By ensuring that the cylinder means 2 is rotated at a sufficient rate, one and the same blade of grass can be cut repeatedly. The grass 9 is thus cut down bit by bit by the successively arranged knives which are passing the cutting position K until a preset cutting height has been reached, which results in the clippings 10 being cut into finer pieces that can filter into the lawn more easily when returned to the same. Thanks to this, it is possible to return the clippings 10 to the lawn in an aesthetically more attractive manner.

In the above embodiment, the insertion means 7 is thus formed of the discs 5 provided with teeth 8. When rotating the cylinder means 2, the teeth 8 are caused to engage the grass 9 and convey it to the abutment 3. However, also the discs 5 in themselves have an advantageous effect on the cutting process. When cutting grass by means of helical knives 6, the grass 9 is subject to a force acting to displace the grass in the lateral direction. This lateral displacement is prevented by the discs 5, which act for dividing the grass 9 into parallel strings. As a result, the grass 9 is not inclined when it is inserted into the abutment 3.

It would be conceivable to provide a cylinder unit 1 by arranging a plurality of discs 5 along the shaft 4 of the cylinder means 2 and let the insertion means 7 be composed of said discs 5 only. By their frictional contact with the grass 9, the discs 5 would then to a certain extent contribute to the raising, combing and orienting of the grass while acting for dividing the grass 9 into strings.

It is advantageous, however, to provide the discs 5 with teeth 8 since the engagement between the insertion means 7 and the grass 9 is thus reinforced.

By arranging a plurality of discs 5 along the shaft 4 of the cylinder means 2 and by mounting the knives 6 on the discs 5, it is possible to reduce the width of the knives 6 in relation to their length. By this reduction of the radial area of the knives 6, it is possible to reduce the air resistance and thus the torque required for the rotation of the cylinder means 2. This also reduces the weight and the energy consumption of a motor-driven cylinder lawn mower comprising a cylinder unit 1 or, alternatively, a more manageable, manually driven lawn mower comprising an inventive cylinder unit 1 is provided. In addition, the manufacturing cost of each knife 6 can be reduced.

Figure 8:
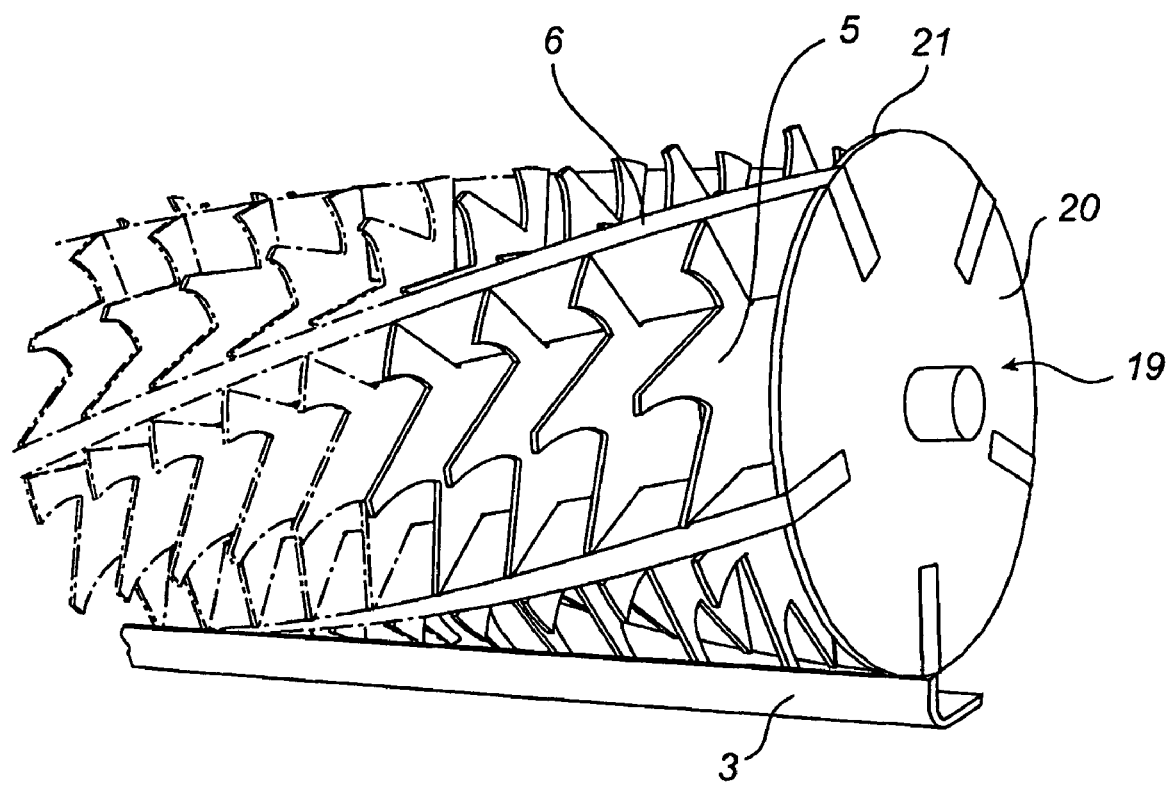
FIG. 8 is a schematic perspective view of a cylinder unit with a stopping means.

In a cylinder unit 1 with an insertion means 7 in the form of a number of discs 5 provided with peripheral teeth 8, there is a risk that the teeth 8 will hit the abutment 3 if the latter is subject to forces and if a knife 6 fails to abut against the abutment 3. This may, for example, occur if the abutment 3 hits a stone just in the gap between two successively arranged knives 6, and this may result in the abutment 3 being moved radially inwards to a position radially inwardly of the teeth 8. This problem can be solved with the aid of a stopping means 19 according to FIG. 8, to which reference is now made. As is evident from the Figure, a circular end plate 20 is arranged at one end of the cylinder means 2 and a corresponding end plate (not shown) is arranged at the other end of the cylinder means 2. These end plates 20, which thus form said stopping means 19, have a diameter coinciding with that of the discs 5. Each end plate 20 further has a continuous peripheral edge 21 arranged immediately radially inwardly of the abutment 3. Thanks to the continuous peripheral edge 21 of each end plate 20, a guiding effect is obtained which prevents the abutment 3 from being displaced radially inwards even if it is affected by, for example, a twig or a stone. This also eliminates the risk that the teeth will engage the abutment 3. It will be appreciated that the stopping means 19 can also be formed of circular plates arranged in other positions along the shaft 4 of the cylinder means 2.

Figure 9:
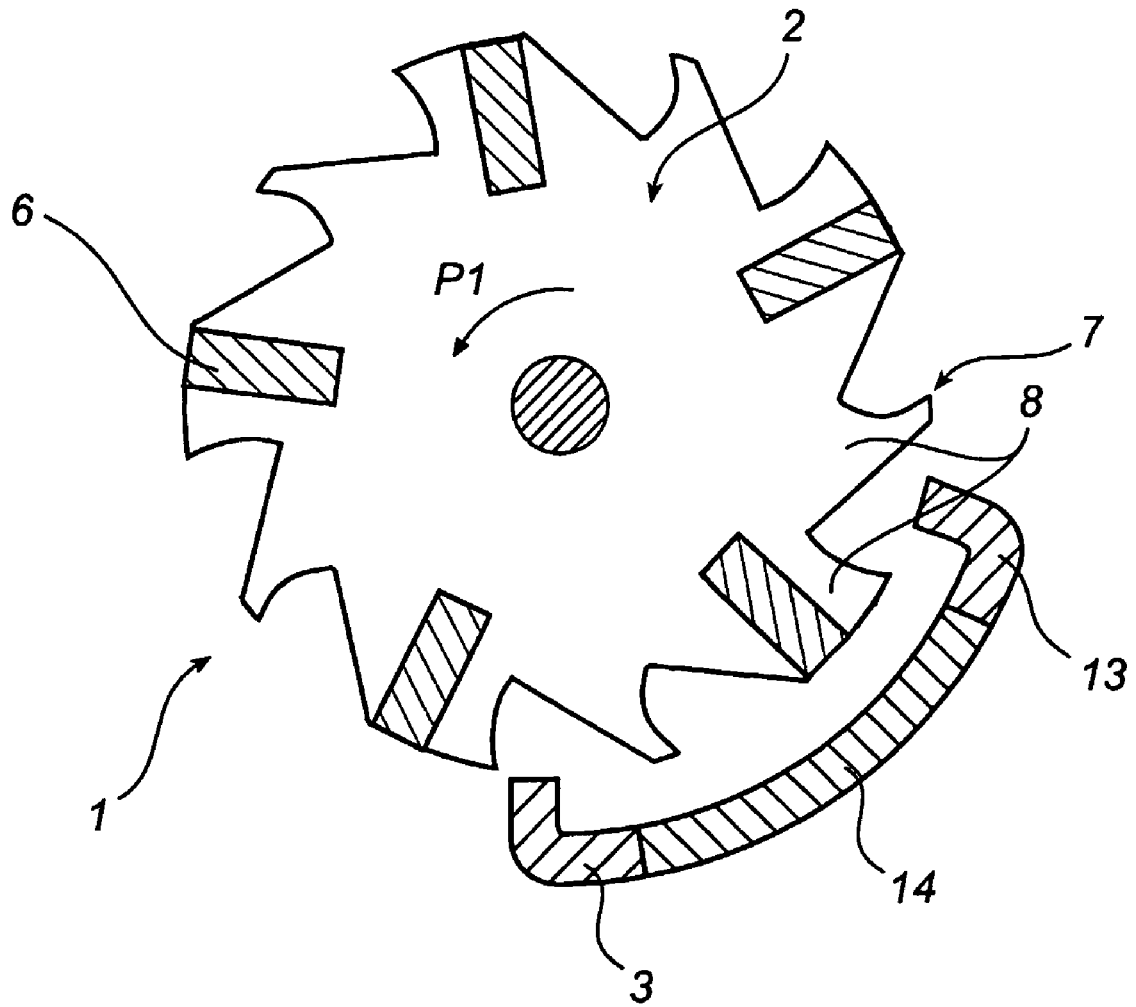
FIG. 9 is a schematic side view of an embodiment of a cylinder unit.

FIG. 9, to which reference is now made, illustrates another embodiment of a cylinder unit 1, which differs from the embodiment shown in FIG. 5 in that it comprises a second fixedly mounted abutment 13 and a guiding plate 14. The second abutment 13 is arranged after the first abutment 3, seen in the direction of rotation P1 of the cylinder means 2, to cooperate with the rotatable knives 6 for further cutting of the clippings cut at the first abutment 3, which results in the clippings being cut into even finer pieces. The guiding plate 14 is mounted between the abutments 3, 13 to convey, in cooperation with the insertion means 7, the clippings cut at the first abutment 3 to the second abutment 13. The teeth 8 of the insertion means 7 ensure that the clippings will be passed on from the first abutment 3 with such an orientation that the clippings will be inserted substantially perpendicularly to the second abutment 13. This ensures that the clippings will actually be cut into finer pieces at the second abutment 13.

According to this embodiment of a cylinder unit 1, a better mulching effect is thus obtained. It will be understood that it is conceivable to provide the inventive cylinder unit 1 with several abutments and guiding plates to further improve the mulching effect.

The insertion means 7 can be made of a wear-resistant material to ensure a satisfactory service life. Advantageously, said discs 5 are thus made of a metallic material, and the teeth 8 which are integrally formed with said discs 5 can have a wear-resistant surface layer. It is, however, also possible to manufacture the teeth 8 separately and provide the teeth 8 with a wear-resistant surface layer. Also the above-described pins 11a, 11b can be made of a metallic material and their outer ends 12 can have a wear-resistant surface layer.

Figure 10:
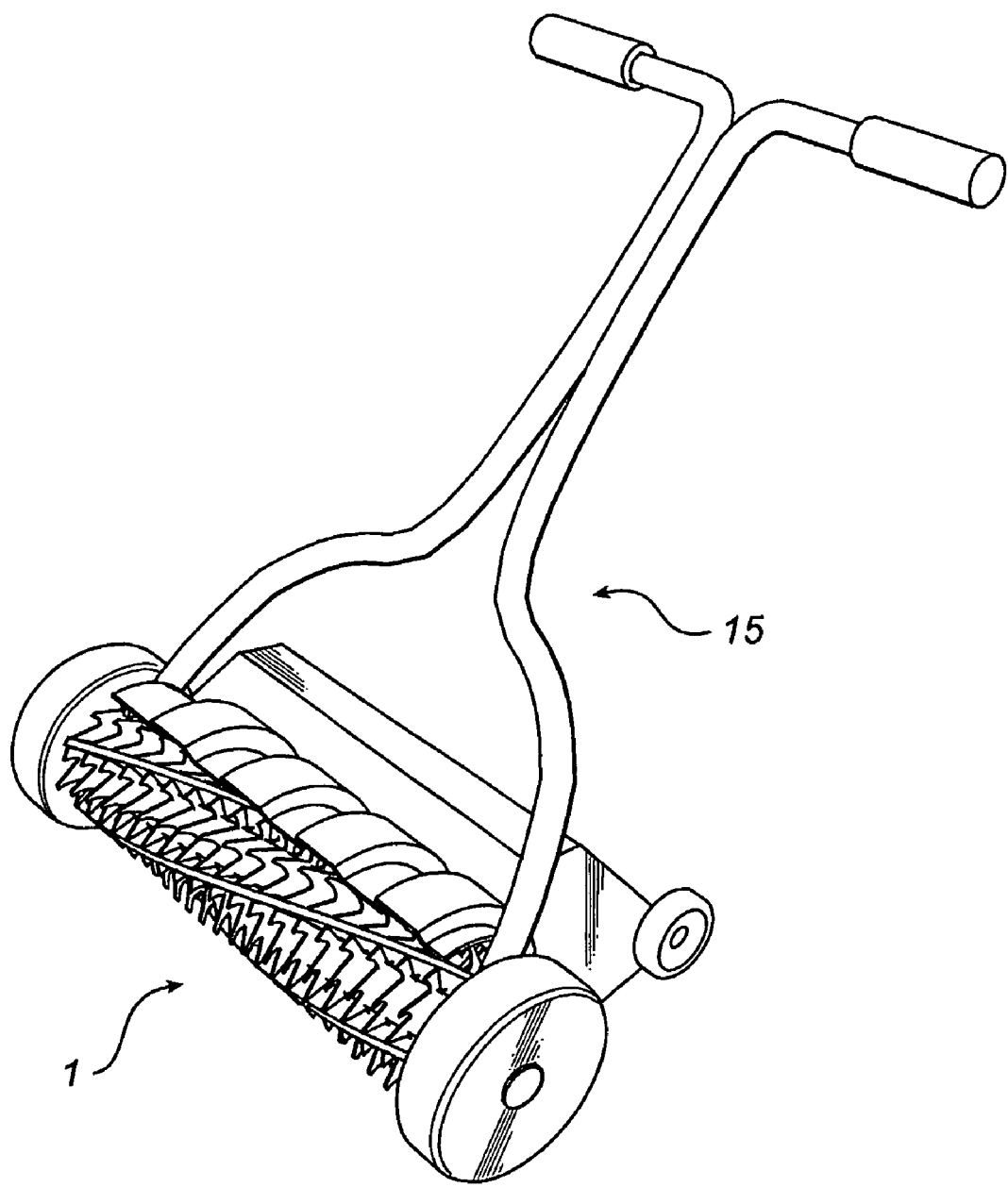
FIG. 10 is a perspective view of a first embodiment of a cylinder lawn mower with a cylinder unit according to FIG. 5.

FIG. 10 shows a first embodiment of a manually driven cylinder lawn mower 15 comprising a cylinder unit 1 of the type described with reference to FIG. 5. The other parts of the cylinder lawn mower 15 are of conventional kind and will therefore not be described. It will be understood that the cylinder lawn mower 15 shown in FIG. 10 can also be a motor-driven cylinder lawn mower.

Figure 11:
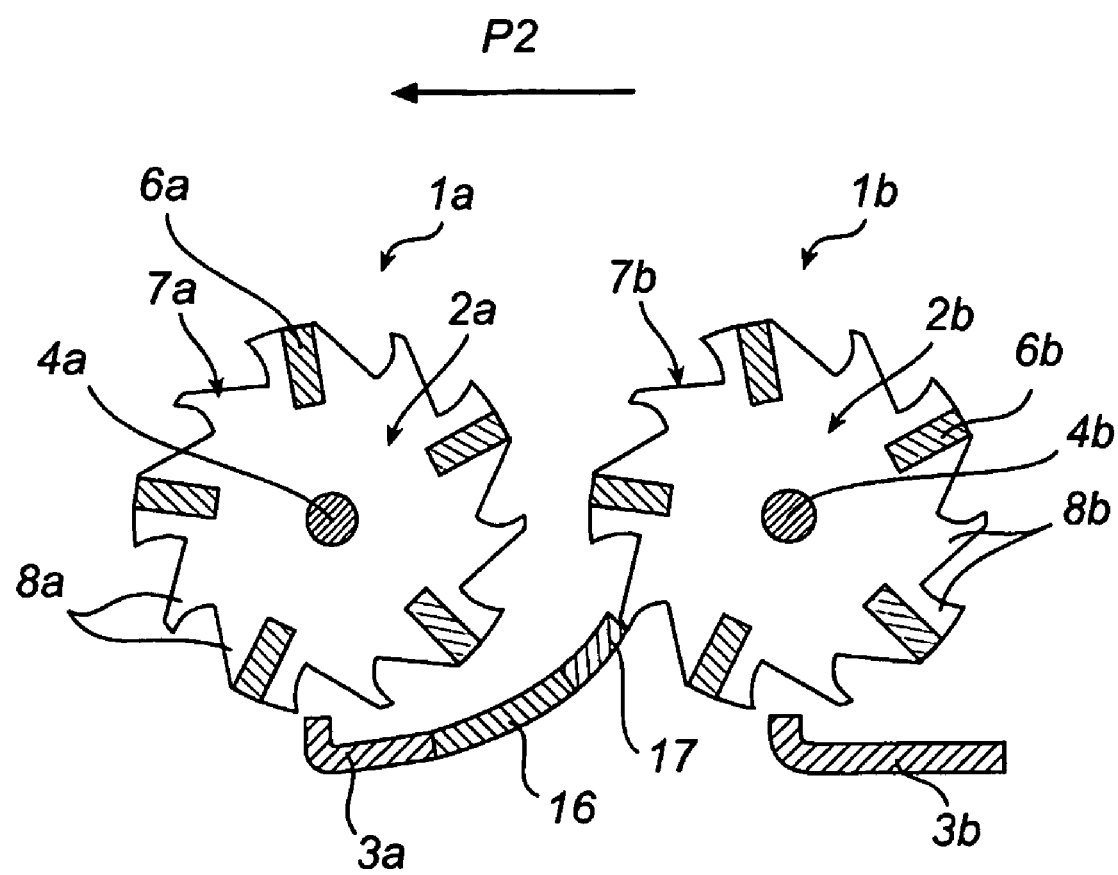
FIG. 11 is a schematic side view which illustrates two successively arranged cylinder units according to FIG. 5.

It is also conceivable to provide a cylinder lawn mower with two successively arranged cylinder units 1 as shown in FIG. 11, to which reference is now made.

FIG. 11 illustrates a first 1a and a second 1b cylinder unit of the type described above with reference to FIG. 5 as well as a guiding plate 16 and an associated abutment 17, which is located in connection with the second cylinder unit 1b before, seen in the direction of rotation P1 of the cylinder means, its first abutment 3b.

The second cylinder unit 1b does not have to be of the above type but may be of conventional type.

The second cylinder unit 1b is placed after, seen in the travelling direction P1 of the cylinder lawn mower, the first cylinder unit 1a, the two cylinder units 1a, 1b operating along the same cutting width. The guiding plate 16 is arranged to convey the clippings from the first cylinder unit 1a to a second abutment 17 of the second cylinder unit 1b. As a result, the second cylinder unit 1b will receive the clippings from the first cylinder unit 1a and act for cutting the clippings into still finer pieces. More specifically, the clippings from the first cylinder means 1a will be cut into finer pieces once again at said second abutment 17 of the second cylinder unit 1b. By the rotation of the second cylinder means 2b, some of the clippings will be beaten into the lawn. But some of the clippings will be entrained by the cylinder means 2b to its first abutment 3b. Furthermore, the insertion means 7b will rake up some more of the clippings that have fallen down on the lawn and pass them on to said first abutment 3b.

The second cylinder unit 1b can also be set to cut the lawn at a cutting level lower than that of the first cylinder unit 1a.

Figure 12:
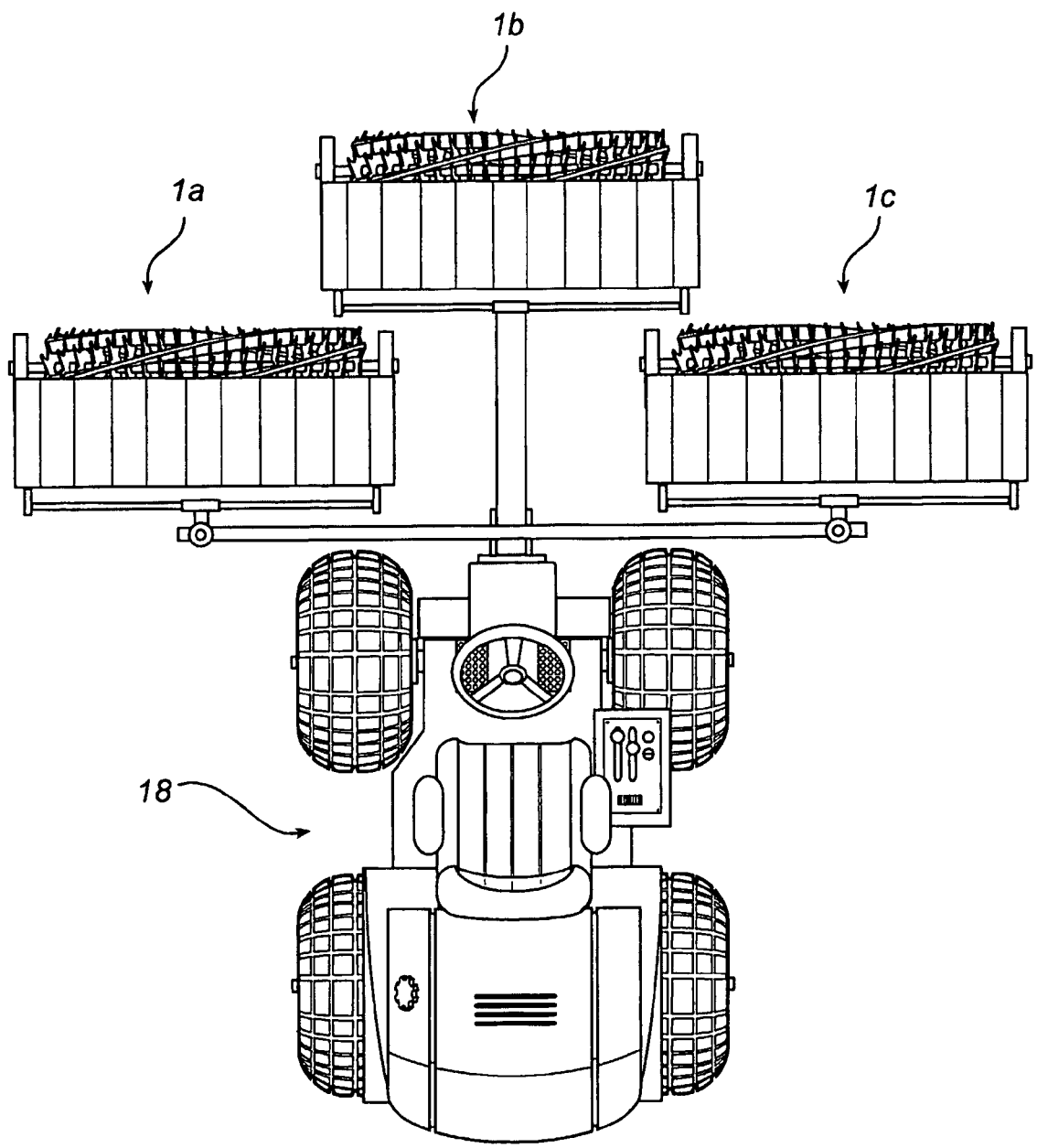
FIG. 12 is a top plan view of a second embodiment of a cylinder lawn mower with three cylinder units according to FIG. 5.

FIG. 12, to which reference is now made, illustrates a second embodiment of a cylinder lawn mower 18 comprising three cylinder units 1a, 1b, 1c of the type described above with reference to FIG. 5. The lawn mower 18, which may, of course, have fewer or more cylinder units than three, is of a ride-on type, and its cylinder units are placed in the lateral direction so as to cover, with a certain overlap, a greater cutting width, which makes the lawn mower suitable for cutting vast areas.

According to the present invention, a cylinder lawn mower and a cylinder unit intended therefor are thus provided. The cylinder unit 1 comprises an insertion means, which by the rotation of a cylinder means 2 is adapted to engage and insert grass into an abutment 3 of the cylinder unit 1. More specifically, the insertion means is arranged to operate in the free circle segment formed between two successively arranged knives 6 and, in some cases, also outwardly of said circle segment. Owing to this, the grass can be raised, combed and oriented, which allows a better cutting result. More specifically, it is possible to prevent grass, even if it is long, from being brought under the abutment and thus not being cut. The same applies to individual, long blades of grass. In addition, it is ensured that the grass is brought to the abutment with its tops turned to the same. As a result, each blade of grass can be cut gradually, which means that finely cut clippings are obtained that can be returned to the lawn in an aesthetically attractive manner.

It should be noted that the mulching effect is obtained in an energy-saving manner. In its simplest embodiment, the inventive cylinder unit comprises an abutment, at which the grass is cut successively owing to the design of the insertion means. The grass is thus cut into finer pieces without the need of any further processing, which means that the energy consumption, which is typically low in the case of cylinder lawn mowers, is not much increased.

According to the present invention, the cylinder unit can be provided with extra abutments or a subsequently arranged cylinder unit for cutting of the clippings into still finer pieces. Nevertheless, the total processing time of the clippings, and thus the energy consumption of the cylinder lawn mower, is significantly reduced compared to the processing time required to cut the clippings in rotor lawn mowers.

It will be understood that the present invention is not limited to the above-described embodiments.

It will also be appreciated that the inventive cylinder unit can also be used as agricultural implement, for example, when handling ensilage. In that case, means are arranged to collect the clippings that have been cut into pieces in the cylinder unit.

Finally, it will be understood that a lawn mower comprising one or more inventive cylinder units can be designed in many different ways. They can be manually driven or motor-driven. The motor can be adapted to run only the cylinder units or the entire lawn mower. Furthermore, the motor can be driven by electricity or petrol. It will be appreciated that the low energy consumption of the inventive cylinder unit makes it suitable for use of electric power.

Many modifications and variations are thus conceivable, and therefore the scope of the invention is defined only by the appended claims.

The invention claimed is:

1. A cylinder unit for a cylinder lawn mower, comprising a fixedly mounted abutment,
   cylinder means, which is rotatable about a longitudinal axis and which is provided with at least one knife, and
   insertion means for engaging and inserting grass into the abutment, said insertion means comprising a plurality of pins with a radially outer end,
   each knife by rotation of the cylinder means being movable to a cutting position, in which the knife cooperates with the abutment to allow grass cutting,
   the pins being rotatably mounted directly on a pin shaft arranged eccentrically to the longitudinal axis of the cylinder means, said pins extend from said pin shaft in the radial direction, each pin being movable by rotation thereof about said pin shaft between a first and a second position,
   in which first position the pin extends beyond the periphery of the cylinder means so that the outer end of the pin is located radially outwardly of each knife and
   in which second position the pin is located inwardly of the periphery of the cylinder means so that the outer end of the pin is located radially inwardly of or radially on a level with each knife,
   said pin being arranged to take the first position in an angular range, seen in the direction of rotation of the cylinder means, immediately before the cutting position and the second position at least when passing the cutting position, and
   said cylinder means when rotated being adapted to engage the pins to rotate them about said pin shaft.

2. The cylinder unit as claimed in claim 1, wherein each pin when operating the cylinder unit has an upward motion component when passing said cutting position.

3. The cylinder unit as claimed in claim 1 or 2, wherein each pin when operating the cylinder unit has an upward motion component in a subrange of the angular range immediately before, seen in the direction of rotation of the cylinder means, said cutting position.

4. The cylinder unit as claimed in claim 1, wherein the insertion means is arranged for said engagement and insertion of grass along substantially the entire length of the cylinder means along the longitudinal axis of the cylinder means.

5. The cylinder unit as claimed in claim 1, wherein the insertion means further comprises a plurality of discs, which are concentrically arranged about and equidistantly arranged along said longitudinal axis.

6. The cylinder unit as claimed in claim 5, wherein said discs support the at least one knife.

7. The cylinder unit as claimed in claim 5, wherein the discs have peripheral teeth.

8. The cylinder unit as claimed in claim 7, wherein a number of the teeth on each disc are set.

9. The cylinder unit as claimed in claim 8, wherein the set teeth of each disc are set in two opposite directions.

10. The cylinder unit as claimed in claim 7, wherein the teeth of each disc are located radially on a level with each knife.

11. The cylinder unit as claimed in claim 1, wherein the insertion means is made of a metallic material.

12. The cylinder unit as claimed in claim 1, wherein the insertion means has a wear-resistant surface layer.

13. The cylinder unit as claimed in claim 7, wherein the teeth of each disc are made of a metallic material.

14. The cylinder unit as claimed in claim 7, wherein the teeth of each disc have a wear-resistant surface layer.

15. The cylinder unit as claimed in claim 7, wherein the teeth are replaceable.

16. The cylinder unit as claimed in claim 1, wherein each pin is made of a metallic material.

17. The cylinder unit as claimed in claim 1, wherein the outer end of each pin has a wear-resistant surface layer.

18. The cylinder unit as claimed in claim 1, further comprising a second abutment arranged, seen in the direction of rotation of the cylinder means, after the first abutment, said first abutment being located substantially under the cylinder means.

19. The cylinder unit as claimed in claim 18, wherein a guiding plate is arranged to convey cut grass from the first abutment to the second abutment.

20. The cylinder unit as claimed in claim 1, wherein the cylinder means comprises a stopping means which prevents the abutment from being displaced radially inwards.

21. The cylinder unit as claimed in claim 20, wherein the stopping means comprises at least one circular plate which is supported by a shaft and has a continuous peripheral edge arranged immediately radially inwardly of the abutment.

22. A cylinder lawn mower, comprising at least one cylinder unit as claimed in claim 1.

23. A cylinder lawn mower, comprising a first cylinder unit as claimed in claim 1 and a second cylinder unit, the second cylinder unit being arranged, seen in the travelling direction of the cylinder lawn mower, after the first cylinder unit.

24. The cylinder lawn mower as claimed in claim 23, wherein a guiding plate is arranged to convey cut grass from the first cylinder unit to the second cylinder unit.

25. The cylinder lawn mower as claimed in claim 24, wherein the second cylinder unit comprises an abutment, said guiding plate being arranged to convey cut grass to said abutment.

26. The cylinder lawn mower as claimed in claim 22, wherein the cylinder lawn mower is of a ride-on type.

* * * * *